US010824832B2

(12) United States Patent
Kluckner et al.

(10) Patent No.: US 10,824,832 B2
(45) Date of Patent: Nov. 3, 2020

(54) BARCODE TAG DETECTION IN SIDE VIEW SAMPLE TUBE IMAGES FOR LABORATORY AUTOMATION

(71) Applicant: Siemens Healthcare Diagnostics Inc., Tarrytown, NY (US)

(72) Inventors: Stefan Kluckner, Berlin (DE); Yao-Jen Chang, Princeton, NJ (US); Wen Wu, Kirkland, WA (US); Benjamin Pollack, Jersey City, NJ (US); Terrence Chen, Princeton, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 172 days.

(21) Appl. No.: 15/551,565

(22) PCT Filed: Feb. 16, 2016

(86) PCT No.: PCT/US2016/018084
§ 371 (c)(1),
(2) Date: Aug. 16, 2017

(87) PCT Pub. No.: WO2016/133908
PCT Pub. Date: Aug. 25, 2016

(65) Prior Publication Data
US 2018/0239936 A1 Aug. 23, 2018

Related U.S. Application Data

(60) Provisional application No. 62/117,270, filed on Feb. 17, 2015.

(51) Int. Cl.
*G06K 7/10* (2006.01)
*G06K 7/14* (2006.01)
(Continued)

(52) U.S. Cl.
CPC ... *G06K 7/10722* (2013.01); *G01N 35/00732* (2013.01); *G06K 7/1413* (2013.01);
(Continued)

(58) Field of Classification Search
CPC .............. G06K 7/10722; G06K 7/1439; G06K 7/1413; G06K 9/629; G06K 2209/19; G01N 35/00732; G01N 2035/00752
See application file for complete search history.

(56) References Cited

U.S. PATENT DOCUMENTS 5,286,959 A * 2/1994 Demachi ................ G01N 35/04
235/462.14
5,334,825 A * 8/1994 Maddox ............. G06K 7/10871
235/383

(Continued)

FOREIGN PATENT DOCUMENTS

JP H09-001791 A 1/1997
JP H11-224304 A 8/1999
(Continued)

OTHER PUBLICATIONS

PCT International Search Report and Written Opinion dated May 11, 2016 (7 Pages).
(Continued)

*Primary Examiner* — Daniel I Walsh

(57) ABSTRACT

Barcode tag conditions on sample tubes are detected utilizing side view images of sample tubes for streamlining handling in clinical laboratory automation systems. The condition of the tags may be classified into classes, each divided into a list of additional subcategories that cover individual characteristics of the tag quality. According to an embodiment, a tube characterization station (TCS) is utilized to obtain the side view images. The TCS enables the simultaneous or near-simultaneous collection of three images for each tube, resulting in a 360 degree side view for (Continued)

each tube. The method is based on a supervised scene understanding concept, resulting in an explanation of each pixel into its semantic meaning. Two parallel low-level cues for condition recognition, in combination with a tube model extraction cue, may be utilized. The semantic scene information is then integrated into a mid-level representation for final decision making into one of the condition classes.

18 Claims, 6 Drawing Sheets

(51) Int. Cl.
    *G06K 9/62*     (2006.01)
    *G01N 35/00*     (2006.01)
    *B01L 3/00*     (2006.01)

(52) U.S. Cl.
    CPC ......... *G06K 7/1439* (2013.01); *G06K 7/1491* (2013.01); *G06K 9/629* (2013.01); *B01L 3/5453* (2013.01); *G01N 2035/00752* (2013.01); *G06K 2209/19* (2013.01)

(56) References Cited

U.S. PATENT DOCUMENTS

| | | | | |
|---|---|---|---|---|
| 5,637,854 | A * | 6/1997 | Thomas | G06K 7/10613 235/454 |
| 5,663,545 | A * | 9/1997 | Marquiss | B01L 3/5453 235/375 |
| 6,039,252 | A * | 3/2000 | Maltsev | G06K 7/14 235/462.25 |
| 6,598,796 | B2 * | 7/2003 | Harrop | B01L 3/5453 235/462.01 |
| 7,227,622 | B2 * | 6/2007 | Itoh | G01N 33/48 356/39 |
| 7,382,911 | B1 * | 6/2008 | Meier | G06K 7/10851 382/139 |
| 7,490,773 | B2 * | 2/2009 | McVicker | G06K 9/20 235/435 |
| 10,114,999 | B1 * | 10/2018 | Burke | G06K 7/1491 |
| 10,509,934 | B1 * | 12/2019 | Reynolds | G06K 7/1434 |
| 2001/0049147 | A1 * | 12/2001 | Bierre | B01L 3/5453 436/165 |
| 2002/0055861 | A1 * | 5/2002 | King | G06Q 10/10 705/4 |
| 2002/0195491 | A1 * | 12/2002 | Bunch, III | G06Q 10/087 235/385 |
| 2003/0141368 | A1 * | 7/2003 | Pascual | G06F 19/3462 235/462.07 |
| 2003/0220761 | A1 * | 11/2003 | Biwa | G01N 35/00603 702/127 |
| 2005/0036907 | A1 * | 2/2005 | Shoji | G01N 35/00732 422/400 |
| 2005/0196323 | A1 * | 9/2005 | Itoh | G01N 35/00732 422/82.05 |
| 2006/0043188 | A1 * | 3/2006 | Kricorissian | B07C 3/14 235/462.08 |
| 2007/0036686 | A1 * | 2/2007 | Hatamian | B01L 3/5453 422/400 |
| 2007/0053794 | A1 * | 3/2007 | Perez | G01N 35/00732 422/82.05 |
| 2008/0003148 | A1 * | 1/2008 | Dause | B01L 3/5453 422/410 |
| 2008/0297355 | A1 * | 12/2008 | Matsumoto | G06Q 50/30 340/572.7 |
| 2009/0090786 | A1 * | 4/2009 | Hovis | G06K 7/1421 235/494 |
| 2009/0272809 | A1 * | 11/2009 | Matsuda | G06K 7/10544 235/462.25 |
| 2010/0123551 | A1 * | 5/2010 | Fritchie | G16H 10/40 340/10.1 |
| 2010/0299179 | A1 * | 11/2010 | Alonso | G06Q 10/0637 705/7.36 |
| 2011/0045521 | A1 * | 2/2011 | Itoh | G01N 35/04 435/29 |
| 2011/0085951 | A1 * | 4/2011 | Nakahana | B01L 9/06 422/549 |
| 2011/0102542 | A1 * | 5/2011 | Chen | G06T 3/4038 348/37 |
| 2011/0174708 | A1 * | 7/2011 | Oota | G01N 35/1097 210/198.2 |
| 2011/0181875 | A1 * | 7/2011 | Nakahana | B01L 3/5453 356/246 |
| 2012/0080515 | A1 * | 4/2012 | van der Merwe | G06K 7/1447 235/375 |
| 2012/0138674 | A1 * | 6/2012 | Chen | G01N 35/00732 235/375 |
| 2013/0076882 | A1 * | 3/2013 | Itoh | G01N 21/25 348/77 |
| 2013/0129166 | A1 * | 5/2013 | Muller | G01B 11/02 382/128 |
| 2013/0142596 | A1 * | 6/2013 | Murakami | B65G 49/00 414/222.01 |
| 2014/0374480 | A1 * | 12/2014 | Pollack | G01N 35/04 235/440 |
| 2016/0025757 | A1 * | 1/2016 | Pollack | G01N 21/253 348/143 |
| 2016/0086001 | A1 * | 3/2016 | Kozicki | G06F 16/51 235/470 |
| 2018/0033256 | A1 * | 2/2018 | Hamidat | G06K 7/1447 |
| 2018/0046883 | A1 * | 2/2018 | Soomro | B01L 9/06 |
| 2018/0136096 | A1 * | 5/2018 | Foggi | G01N 1/312 |
| 2019/0035497 | A1 * | 1/2019 | Kolberg | G06K 7/1413 |

FOREIGN PATENT DOCUMENTS

| | | |
|---|---|---|
| JP | 2009-196134 A | 9/2009 |
| JP | 2013-040895 A | 2/2013 |
| JP | 2013-152244 A | 8/2013 |
| JP | 2014-189276 A | 10/2014 |

OTHER PUBLICATIONS

Ago B. Ahene et al: "Ligand Binding Assays in the 21st Century Laboratory: Automation", The AAPS Journal, vol. 14, No. 1, Feb. 1, 2012 (Feb. 1, 2012), pp. 142-153, XP055446244, DOI: 10.1208/s12248-012-9323-z *abstract* *second paragraph; p. 148, coumn 2* * section Barcde Readers for Sample and Assay Plate Tracking; p. 151*

Extended EP Search Report dated Feb. 12, 2018 of corresponding European Application No. 16752907.2, 5 Pages.

Nakamasa Inoue, et al., q-Gaussian Mixture Models for Video Semantic Indexing, IPSJ 2012—IPSJ SIG Technical Report Computer Vision and Image Media (CVIM), Japan, IPSJ, 2012, No. 183, pp. 1.7.

* cited by examiner

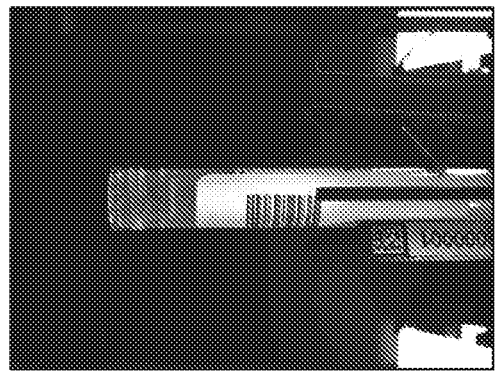
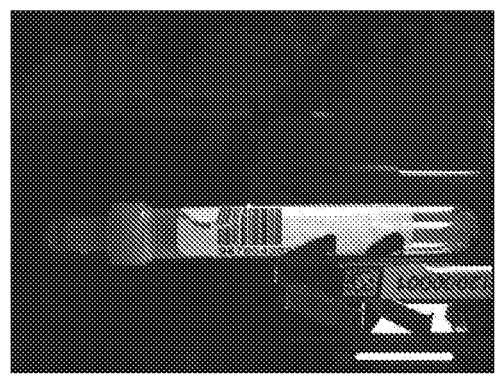
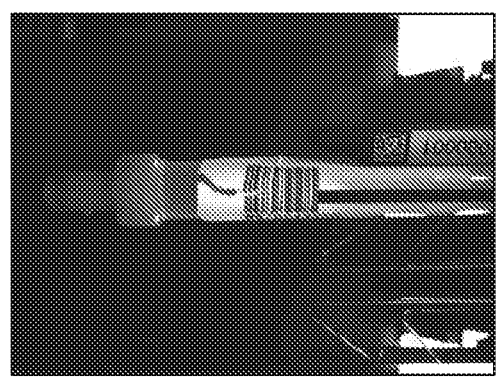
FIG. 2

| | Barcode | Short Description |
|---|---|---|
| Good | 0 | Perfect Single Barcode |
| | 1 | Perfect Barcode, Low |
| | 5 | Perfect Double Barcode |
| | 8 | Mild Deformation |
| | 9 | Mild Skew |
| | 12 | Mild Deformation |
| | 19 | Perfect Triple Barcode |
| Warning | 6 | Mild Peeling |
| | 13 | Severe Deformation |
| | 14 | Moderate Peeling |
| | 16 | Multiple Moderate Peeling at Bottom |
| | 21 | Multiple Moderate Peeling at Top |
| | 23 | Mild Tear |
| | 24 | Mild Damaged Symbol |
| | 25 | Moderate Damaged Symbol |
| | 26 | Discolored Barcode |
| Error | 2 | Label Too High |
| | 3 | Label Too Low |
| | 7 | Severe Peeling |
| | 10 | Severe Skew |
| | 11 | Moderate Folded Barcode (One-Side) |
| | 28 | Moderate Folded Barcode (Two-Sides) |
| | 22 | Label Too High |
| | 27 | Severe Tear |
| Total | | |

| Categories | Perfect | Single | Double | Triple |
|---|---|---|---|---|
| Deformation | Perfect | Mild1 | Mild2 | Severe |
| Skew | | Mild | Severe | |
| Peeling | | Mild | Moderate | Multiple Moderate (Top) | Multiple Moderate (Bottom) | Severe |
| Damaged | | Mild | Moderate | | |
| Discolored | | Discolored | | | |
| Tear | | Mild | Severe | | |
| Folding | | Moderate | | | |
| Label Height | | High1 | High2 | Low | Low |

FIG. 4

BARCODE TAG DETECTION IN SIDE VIEW SAMPLE TUBE IMAGES FOR LABORATORY AUTOMATION

CROSS-REFERENCE TO RELATED APPLICATIONS

This application claims priority to U.S. Provisional Application Ser. No. 62/117,270 entitled "BARCODE TAG DETECTION IN SIDE VIEW SAMPLE TUBE IMAGES FOR LABORATORY AUTOMATION," filed on Feb. 17, 2015, the disclosure of which is hereby incorporated by reference in its entirety herein.

This application relates to several of the concepts described in US Patent Application Publication No. US 2016/0025757, and in International Publication No. WO 2015/191702, which are incorporated, herein by reference, in their entirety.

TECHNOLOGY FIELD

The present invention relates generally to detection of conditions of barcode tags, and, more particularly, to utilizing side view sample tube images to classify conditions of barcode tags on sample tubes.

BACKGROUND

Barcode tags are frequently used on sample tubes in clinical laboratory automation systems to uniquely identify and track the sample tubes, and are often the only means that associate a patient with a sample inside a particular sample tube. Through normal, everyday use, the condition of the barcode tags may deteriorate, including tearing, peeling, discoloring, and other deformations. Such deterioration hinders lab automation systems from streamlining the sample tube processing.

Thus, there is a need for detecting barcode tag conditions on sample tubes to streamline sample tube handling in advanced clinical laboratory automation systems. There is also a need for such classification to be automatic, efficient, and unobtrusive.

SUMMARY

Embodiments are directed to detecting barcode tag conditions on sample tubes from side view images to streamline sample tube handling in advanced clinical laboratory automation systems.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 2 is a depiction of exemplary sample tubes with barcode tags, according to embodiments;

FIG. 4 is a representation of conditions of barcode tags, according to an embodiment;

DETAILED DESCRIPTION

Figure 1:
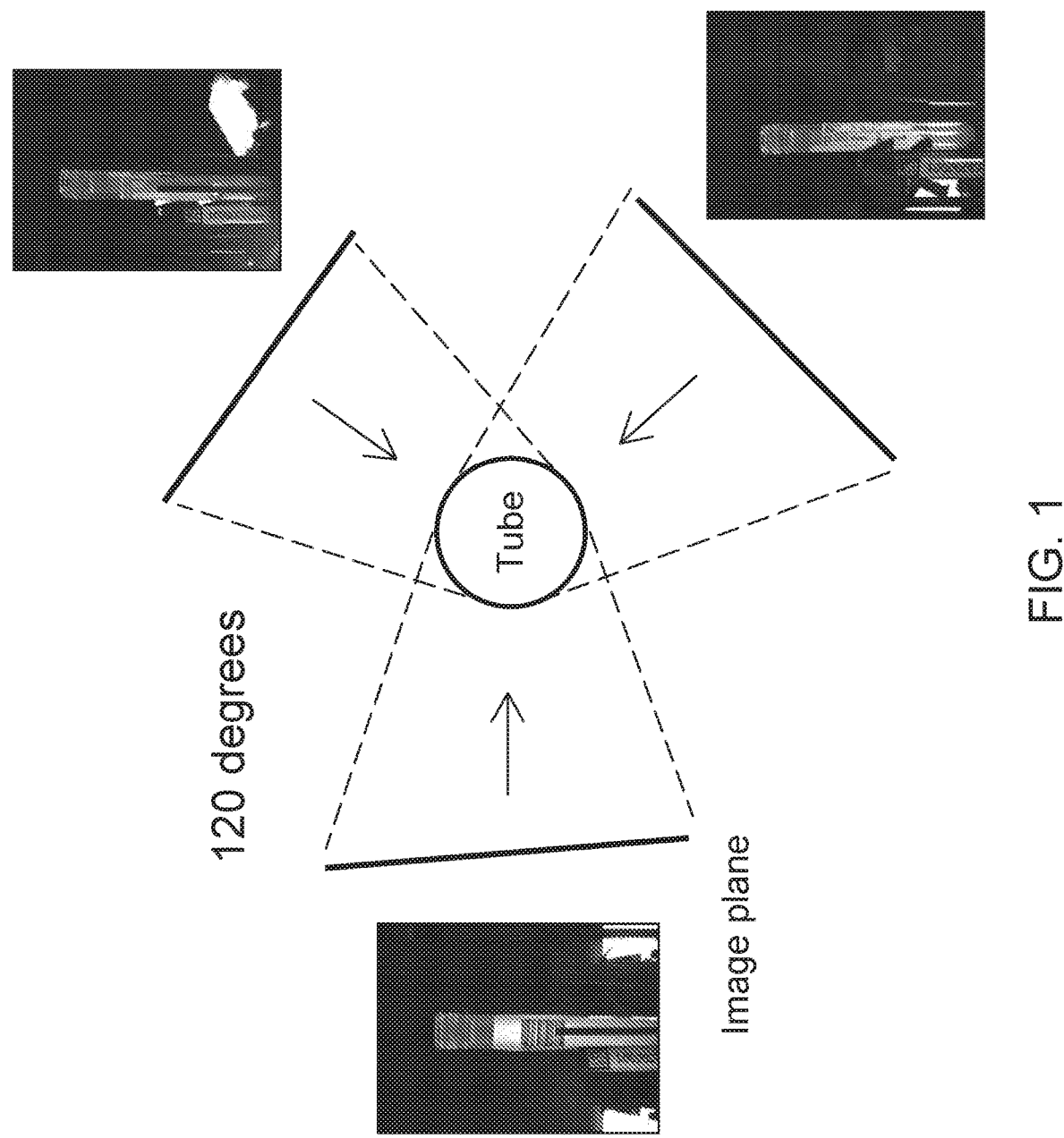
FIG. 1 is a representation of an exemplary tube characterization station to which sample tubes are transferred for detecting barcode tag conditions on the sample tubes from side view images, according to an embodiment.

Embodiments are directed to classifying barcode tag conditions on sample tubes from side view images to streamline sample tube handling in advanced clinical laboratory automation systems. The classification of barcode tag conditions, according to embodiments provided herein, advantageously leads to the automatic detection of problematic barcode tags, allowing for the system, or a user, to take necessary steps to fix the problematic barcode tags. For example, the identified sample tubes with problematic barcode tags may be dispatched to a separate workflow apart from the normal tube handling procedures to rectify the problematic barcode tags.

A method according to embodiments provided herein enables barcode tag detection in tube images to derive an automated decision about the tag condition. The conditions of the barcode tag may be classified into the classes OK, WARNING, and ERROR. Each of the three classes are divided, according to an embodiment, into a list of additional subcategories, enabling a refined decision about the quality of the barcode tag. These subcategories cover individual characteristics of the tag quality, such as perfect, peeled, damaged, folded, skewed, deformed, or colored, for example. Additional or alternate classes and subcategories may be used.

According to an embodiment, a tube characterization station (TCS) is utilized to obtain the side view images for the classification of barcode tag conditions on sample tubes. The TCS enables the simultaneous collection of three images for each tube, resulting in a 360 degree side view for each tube. The proposed method is based on a supervised scene understanding concept, resulting in an explanation of each pixel into its semantic meaning. According to an embodiment, two parallel low-level cues for condition recognition, in combination with a tube model extraction cue, are utilized. The semantic scene information is then integrated into a mid-level representation for final decision making into one of the three condition classes.

Semantic segmentation focuses on the explanation of each pixel in the image domain with respect to defined semantic object labels. Due to pixel level segmentation, the object boundaries can be captured accurately. Evaluations on benchmark datasets show that supervised concepts perform best in terms of reliability and classification accuracies. Typically these approaches are based on training and testing phases, taking into account sophisticated and combined features descriptors derived at various levels and hierarchies.

A triplet of images is acquired by using a TCS. The condition of the barcode tag can vary in location, orientation, quality of attachment, and bar code readability. The detection of barcode tag condition requires a mid-level representation which accurately captures spatial and appearance features with respect to the tube model. This mid-level representation captures multi-view information (e.g., 360 degree view from a triplet of images) from various parallel low-level cues which are trained and evaluated individually on relevant image structures.

FIG. 1 is a representation of an exemplary tube characterization station to which sample tubes are transferred for classifying barcode tag conditions on the sample tubes from side view images, according to an embodiment. The sample tubes may be transferred to the TCS from, for example, a drawer system in which tube trays and sample tubes contained thereon are stored. In an embodiment, one or more drawers are provided in a work envelope for a sample handler in an in vitro diagnostics (IVD) environment. The sample tubes may be transferred to the TCS via an arm movable between the drawer system and the TCS.

The TCS includes three cameras, each configured to capture an image of a particular sample tube to together capture a full 360 degree view.

FIG. 2 is a depiction of exemplary sample tubes with barcode tags. As shown, the tube model type and barcode tag condition can vary drastically between sample tubes.

Input Data:

The input data for the system is comprised of three images showing a full 360 degree view of a tube.

Figure 3:
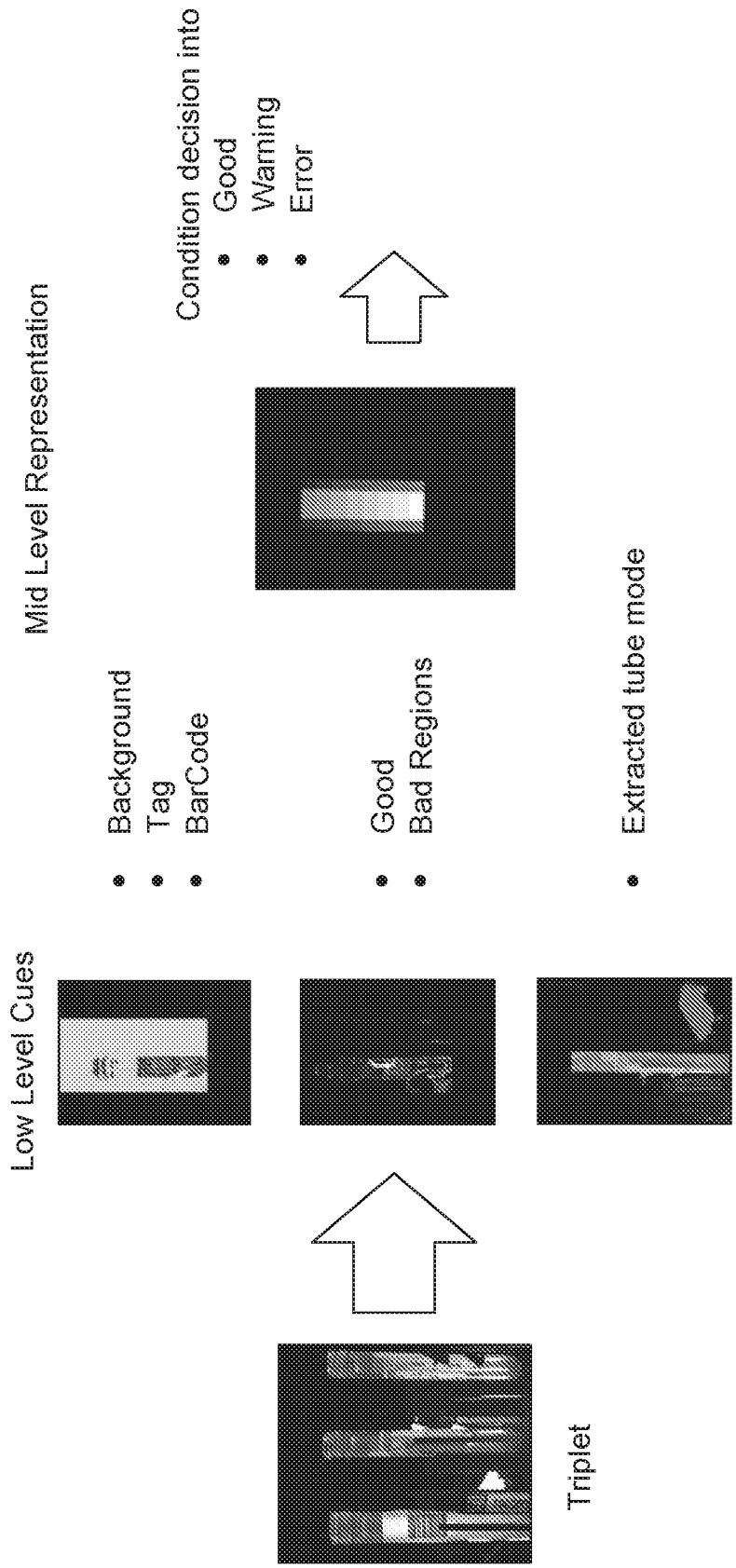
FIG. 3 illustrates a workflow utilizing several parallel low-level cues, which are combined into a mid-level representation, for the barcode tag detection according to embodiments.

Overview:

The proposed method takes as input a triplet of tube images and outputs a label for the condition of the barcode tag (OK, WARNING, ERROR). FIG. 3 shows the proposed workflow: several parallel low-level cues are utilized, which are combined into a mid-level representation. This representation captures the multi-view information and is used for final decision making about the barcode tag condition. Low-level cues include separate semantic segmentations into barcode/tag and background regions, and good vs. bad regions, respectively. An additional low-level cue supports the extraction of the tube model and provides important spatial information for generating the mid-level representation. The proposed method is not limited to these specific cues and may be extended to additional or alternate cues. The proposed concept is based on the training and evaluation phase, requiring labeled input data for the training phase.

FIG. 4 is a representation of conditions of barcode tags in classes, and the subcategories that cover individual characteristics of the tag quality, according to an embodiment.

Figure 5:
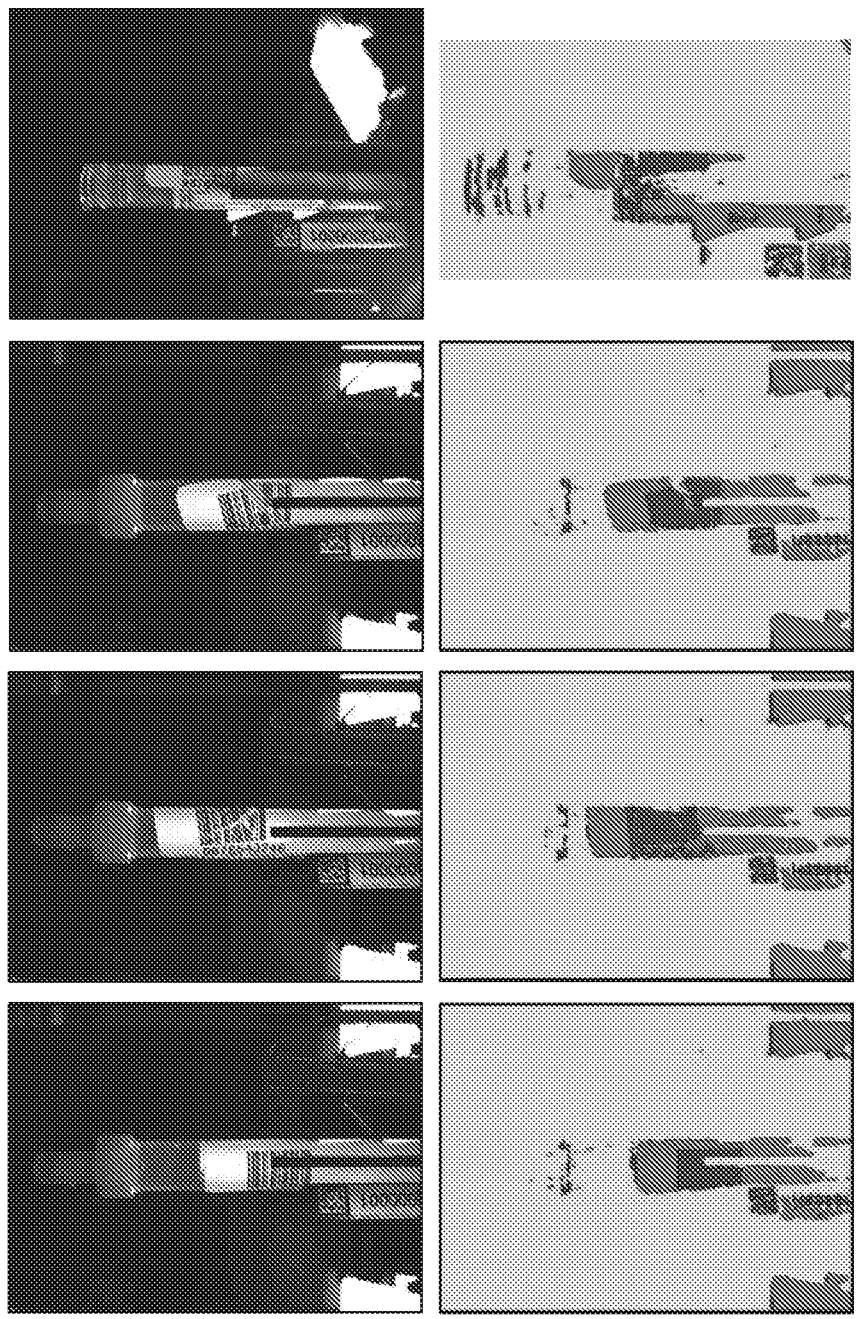
FIG. 5 illustrates use of a low level cue for a detection of barcode tag conditions, according to an embodiment.

Low-Level Cue: Semantic Segmentation:

The proposed concept is based on multiple cues running in a supervised mode. These cues make extensive use of complementary feature descriptors, like color and orientation histograms, statistical descriptors and approximated local binary patterns, which are trained and evaluated on the pixel level. Since short response times are expected, the proposed concept exploits efficient image structures like integral images and uses quick classifiers like random decision trees or decision trees. The training phases require labeled input data: due to pixel level classification, the annotation can be accomplished quickly by image regions annotation using strokes. Training has to be performed once and includes data from different acquisitions with various characteristics. For each low-level cue individually, individual random forest classifiers are trained for binary (Good/Bad regions) and multi-class tasks (Barcode/Tag/Background regions). During runtime the trained classifier provides probabilities on a pixel level with respect to the trained semantic classes. These classifier responses are directly integrated into the mid-level representation as discriminative attributes for final decision making. FIG. 5 illustrates exemplary responses of a semantic segmentation low-level cue applied to sample tubes.

Figure 6:
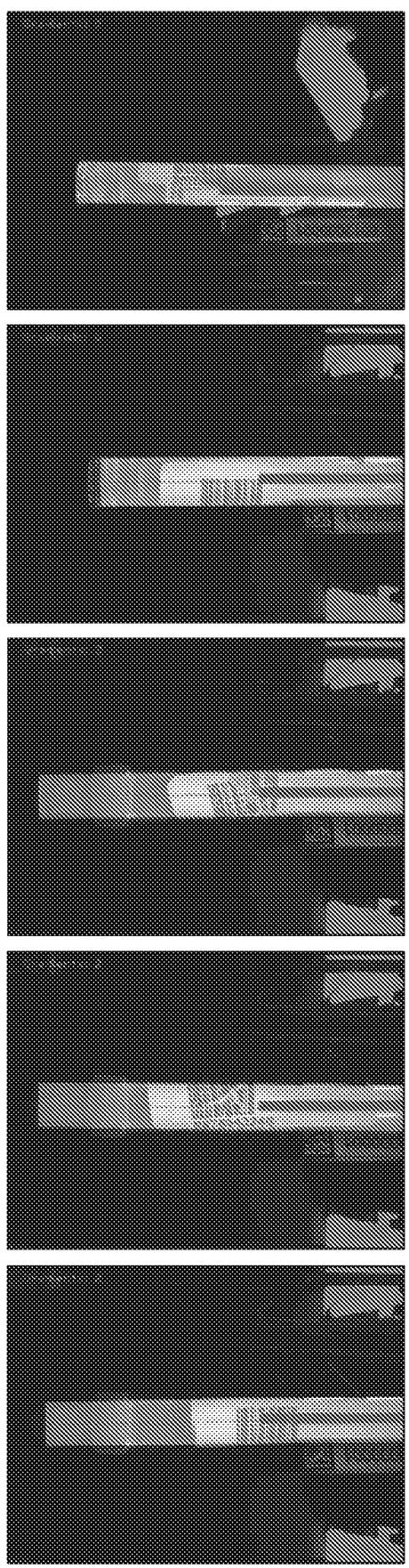
FIG. 6 illustrates use of an additional low level cue for a detection of barcode tag conditions, according to an embodiment.

Low-Level Cue: Tube Model Extraction:

In order to provide spatial information for data aggregation, the segmented tube region and some support segments in the images are used. The tube model can either be derived by using a calibrated 3D setup and external tube detection information (i.e., rendering of the tube's geometry into the images) or also extracted from the images individually (i.e., robust extraction of tube boundaries by using robust line detection methods and logic processing or reasoning). Having the tube model segmented in the images, enables the portioning of the tube and neighboring regions into smaller patches. These patches are used to aggregate classifier responses from the low-level cues as well as information directly from the images. FIG. 6 illustrates exemplary responses of a tube model extraction low-level cue applied to sample tubes.

Mid-Level Representation:

To derive a final decision for the barcode tag condition, the proposed method makes use of aggregation of low-level cue responses into a mid-level representation, which can be seen as descriptor for a triplet of input images. The descriptor is comprised of, but not limited to, classifier responses as well as image features extracted with support of the tube model segmentation (e.g., orientation information and color statistics). Since the representation includes information from multiple views, a data sequence ordering according to the size of the covered barcode regions is applied.

Barcode Tag Condition Classification:

In order to derive a final class label of the condition, classifiers such as random decision trees or Support Vector Machines (SVM) are used. A refinement of the classification results into subcategories and may be accomplished by an additional classification stage or directly on the mid-level representation.

A controller is provided for managing the image analysis of the images taken by the cameras for classifying barcode tag conditions on sample tubes from side view images. The controller may be, according to an embodiment, part of a sample handler that is used in an in vitro diagnostics (IVD) environment to handle and move the tube trays and the tubes between storage locations to analyzers. One or more memory devices may be associated with the controller. The one or more memory devices may be internal or external to the controller.

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A method of detecting barcode tag conditions on sample tubes, the method comprising:
  acquiring, by an image capture system comprised of a plurality of cameras, at least three side view images of a sample tube containing a barcode tag, wherein the side view images are acquired simultaneously by three cameras acquiring a 360 degree view of the sample tube;

analyzing, by one or more processors in communication with the image capture system, the side view images, the analyzing comprising:
  applying a plurality of low-level cues to the side view images of the sample tube to obtain a semantic segmentation using a binary classifier trained to identify good and bad regions defining barcode tag quality regions, and a semantic segmentation using a multi-class classifier trained to identify barcode, tag, and background regions, wherein the semantic segmentation focuses on the explanation of each pixel in an image domain with respect to predefined semantic object labels at pixel level using the multi-class classifier and follows a training and evaluation phase requiring labeled input data and using complementary feature descriptors;
  extracting spatial information of the sample tube, using a tube model segmented in the images enabling the portioning of the tube and neighboring regions into smaller patches, wherein the tube model is derived by using a calibrated 2d setup and external tube detection information or is extracted from the images individually;
  aggregating the classifier responses using the patches as well as imager features extracting with support of the tube segmentation to form a mid-level representation; and
  identifying a final class of the barcode tag indicative of a physical condition of the barcode tag impacting readability of the barcode tag based upon the mid-level representation including a descriptor for the at least three side view images; and
rectifying the barcode tag if the barcode tag is identified into a class indicative of a problematic physical condition of the barcode tag impacting readability of the barcode tag.

2. The method of claim 1, wherein the low-level cues comprise two parallel low-level cues for barcode tag condition recognition and a tube model extraction cue for spatial information.

3. The method of claim 2, wherein the two parallel low-level cues comprise (i) a semantic segmentation for barcode tag and background regions and (ii) a semantic segmentation for barcode tag quality regions.

4. The method of claim 1, wherein the descriptor comprises classifier responses and extracted image features, wherein the extracted image features include orientation information and color statistics.

5. The method of claim 4, wherein the classifier responses and the extracted image features are used to identify the class of the barcode tag from a plurality of pre-defined classes of the barcode tag.

6. The method of claim 5, wherein the pre-defined classes each comprise a plurality of sub-categories.

7. The method of claim 5, wherein the plurality of pre-defined classes include one or more of "OK," "WARNING," and "ERROR."

8. The method of claim 6, wherein the plurality of sub-categories include one or more of "perfect," "peeled," "damaged," "folded," "skewed," "deformed," and "colored".

9. The method of claim 1, wherein the trained classifier is a random forest classifier.

10. A vision system for use in an in vitro diagnostics environment for detecting barcode tag conditions on sample tubes, the vision system comprising:
  a plurality of cameras configured to capture at least three side view images of a sample tube containing a barcode tag, wherein the side view images are acquired simultaneously by three cameras acquiring a 360 degree view of the sample tube; and
  a processor in communication with the cameras, the processor configured to perform the following steps:
    applying a plurality of low-level cues to the side view images of the sample tube to obtain a semantic segmentation using binary classifier trained to identify good and bad regions defining barcode tag quality regions, and a semantic segmentation using a multi-class classifier trained to identify barcode, tag, and background regions, wherein the semantic segmentation focuses on the explanation of each pixel in an image domain with respect to predefined semantic object labels at pixel level using the multi-class classifier and follows a training and evaluation phase requiring labeled input data and using complementary feature descriptors;
    extracting spatial information of the sample tube, using a tube model segmented in the images enabling the portioning of the tube and neighboring regions into smaller patches, wherein the tube model is derived by using a calibrated 2d setup and external tube detection information or is extracted from the images individually;
    aggregating the classifier responses using the patches as well as imager features extracting with support of the tube segmentation to form a mid-level representation;
    identifying a final class of the barcode tag indicative of a physical condition of the barcode tag impacting readability of the barcode tag based upon the mid-level representation including a descriptor for the at least three side view images; and
    rectifying the barcode tag if the barcode tag is identified into a class indicative of a problematic physical condition of the barcode tag impacting readability of the barcode.

11. The system of claim 10, wherein the plurality of low-level cues comprise two parallel low-level cues for barcode tag condition recognition and a tube model extraction cue for spatial information.

12. The system of claim 11, wherein the two parallel low-level cues comprise (i) a semantic segmentation for barcode tag and background regions and (ii) a semantic segmentation for barcode tag quality regions.

13. The system of claim 10, wherein the descriptor comprises classifier responses and extracted image features, wherein the extracted image features include orientation information and color statistics.

14. The system of claim 13, wherein the classifier responses and the extracted image features are used to identify the class of the barcode tag from a plurality of pre-defined classes of the barcode tag.

15. The system of claim 14, wherein the pre-defined classes each comprise a plurality of sub-categories.

16. The system of claim 14, wherein the plurality of pre-defined classes include one or more of "OK," "WARNING," and "ERROR."

17. The system of claim 15, wherein the plurality of sub-categories include one or more of "perfect," "peeled," "damaged," "folded," "skewed," "deformed," and "colored".

18. The system of claim 10, wherein the trained classifier is a random forest classifier.

* * * * *